US012731878B2

(12) United States Patent
Morgan

(10) Patent No.: US 12,731,878 B2
(45) Date of Patent: Sep. 8, 2026

(54) WAVEGUIDE FILTER WITH ELECTRONICALLY CONTROLLABLE VARIABLE DIELECTRIC MATERIAL

(71) Applicant: VIASAT, INC., Carlsbad, CA (US)

(72) Inventor: Ryan I. Morgan, San Diego, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 19/145,460

(22) PCT Filed: Sep. 7, 2023

(86) PCT No.: PCT/US2023/032223
§ 371 (c)(1),
(2) Date: Jul. 2, 2025

(87) PCT Pub. No.: WO2024/147804
PCT Pub. Date: Jul. 11, 2024

(65) Prior Publication Data

US 2026/0121270 A1 Apr. 30, 2026

Related U.S. Application Data

(60) Provisional application No. 63/478,353, filed on Jan. 3, 2023.

(51) Int. Cl.

*H01P 1/20* (2006.01)
*H01P 1/208* (2006.01)
*H01P 7/06* (2006.01)

(52) U.S. Cl.

CPC ............ *H01P 1/2002* (2013.01); *H01P 1/208* (2013.01); *H01P 7/06* (2013.01)

(58) Field of Classification Search

CPC ........... H01P 1/2002; H01P 1/208; H01P 7/06
See application file for complete search history.

(56) References Cited

U.S. PATENT DOCUMENTS 5,459,123 A 10/1995 Das
5,935,910 A 8/1999 Das (Continued)

FOREIGN PATENT DOCUMENTS

CN 104319447 A 1/2015
CN 112952326 B 3/2022
EP 3240102 B1 6/2020

OTHER PUBLICATIONS

Hou, et al., "Varactor-Graphene-Based Bandpass Filter With Independently Tunable Characteristics of Frequency and Amplitude", IEEE Transactions on Components, Packaging and Manufacturing Technology, vol. 12, No. 8, Aug. 2022.

(Continued)

*Primary Examiner* — Samuel S Outten
(74) *Attorney, Agent, or Firm* — HOLZER PATEL DRENNAN

(57) ABSTRACT

A waveguide filter may include a waveguide conduit through which an electromagnetic wave propagates. The waveguide filter may include a resonant cavity comprising at least a portion of the waveguide conduit. The waveguide filter may include a variable dielectric material disposed adjacent to the resonant cavity. The waveguide filter may include a tuning electrode to apply an electric field through the variable dielectric material for modification of a permittivity of the variable dielectric material.

22 Claims, 8 Drawing Sheets

(56) References Cited

U.S. PATENT DOCUMENTS

| | | | |
|---|---|---|---|
| 8,803,636 B2 | 8/2014 | Ermolov | |
| 8,983,251 B2 | 3/2015 | Lu et al. | |
| 2013/0300522 A1 | 11/2013 | Dooley | |
| 2018/0360354 A1* | 12/2018 | Agarwal | A61B 5/1468 |
| 2020/0203293 A1* | 6/2020 | Aygun | H01P 3/16 |
| 2021/0063646 A1 | 3/2021 | Yao et al. | |

OTHER PUBLICATIONS

Huang, et al., "JW4A. 156 Silicon/Graphene Oxide Hybrid Photonic Waveguide Filter", Frontiers in Optics; Rochester, New York, United States; https://opg.optica.org/abstract.cfm?uri=FiO-2016-JW4A.156, Oct. 17, 2016.

Xing, et al., "Ultra-broadband and compact graphene-on-silicon integrated waveguide mode filters", Scientific Reports; 8:9874, 2018.

* cited by examiner

WAVEGUIDE FILTER WITH ELECTRONICALLY CONTROLLABLE VARIABLE DIELECTRIC MATERIAL

BACKGROUND

A waveguide filter is an electronic filter that removes unwanted components from an electromagnetic wave. Typically, a waveguide filter comprises a waveguide conduit that may include coupled resonant cavities. The geometries of the coupled resonant cavities allow certain frequencies to pass through the waveguide conduit while others are rejected.

U.S. Pat. No. 5,459,123 A1 relates to a cylindrical cavity loaded with a ferroelectric rod and is resonant at the dominant mode. EP3240102 A1 relates to an improved resonator, in particular high-frequency resonators. U.S. Pat. No. 5,934,910 relates to high-power band-pass filters made of sections of circular waveguide resonators with sections of the waveguide in between them. CN 104319447 relates to a multilayer coplanar waveguide transmission line based on graphene and a preparation method thereof and belongs to the field of communication electronic components. CN 112952326 relates to a 3D printing X-band CT structure spherical cavity waveguide band-pass filter and a manufacturing method thereof.

SUMMARY

In some aspects, the techniques described herein relate to a waveguide filter with an electronically controlled variable dielectric material. The waveguide filter includes a waveguide conduit and a resonant cavity, including at least a portion of the waveguide conduit. A variable dielectric material is disposed adjacent to the resonant cavity. A tuning electrode applies an electric field through the variable dielectric material for modification of a permittivity of the variable dielectric material.

In some aspects, the techniques described herein relate to a method of operation of a waveguide filter with an electronically controlled variable dielectric material. The method includes applying, with a tuning electrode, an electric field through a variable dielectric material disposed adjacent to a resonant cavity of a waveguide conduit. The method also includes modifying a permittivity of the variable dielectric material in response to the electric field. The permittivity of the variable dielectric material affects performance of the waveguide filter.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
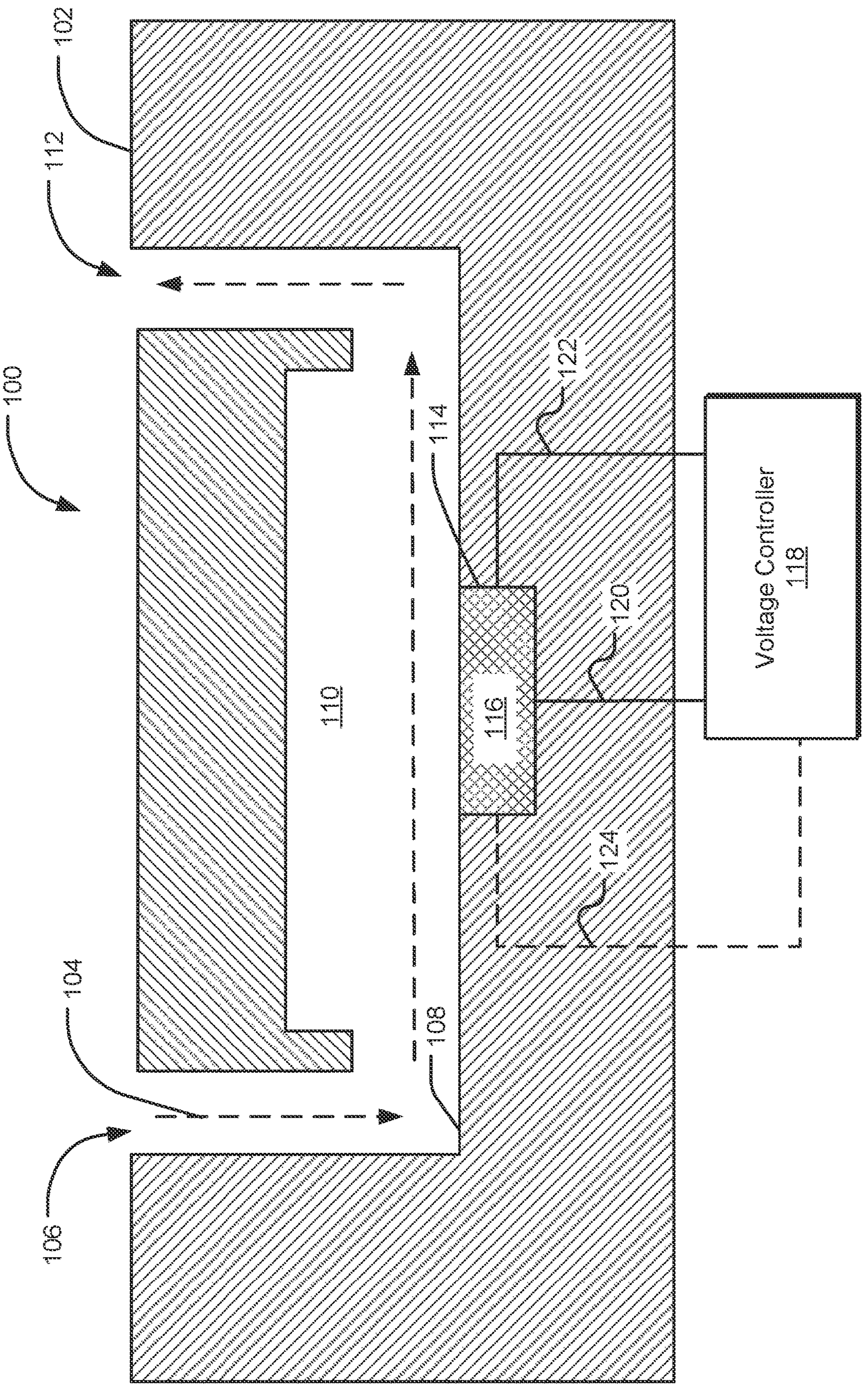
FIG. 1 illustrates an example of a waveguide filter with an electronically controlled variable dielectric material.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

A performance of a waveguide filter may correspond to frequencies of signals that are filtered and/or passed through the waveguide filter, along with a quality of the passed through signals when they exit the waveguide filter (i.e. how much loss is associated with passed and filtered signals). For instance, the desired signal that passes through the waveguide filter should have little to no degradation, while the un-desired signal is attenuated. The performance of a waveguide filter may depend, at least in part, on the physical dimensions of the waveguide filter. As such, tight tolerances may be imposed on a manufacturing process for a waveguide filter to ensure the performance of the waveguide filter is acceptable. Tight tolerances on the physical dimensions of a waveguide filter are required regardless of the method used to manufacture the waveguide filter. For example, waveguide filters are commonly manufactured using milling or casting processes. However, both processes suffer from susceptibility to deviation from a design specification for a physical dimension. For example, cutter bit wear in milling operations and mold wear in casting operations are both sources of deviation from a design specification for a physical dimension that may introduce errors in the manufacturing process. The deviation from a design specification for physical dimensions results in a change in waveguide filter performance that may be outside of acceptable limits.

To counter such undesirable change in waveguide filter performance, manufacturing processes may be closely controlled with tight tolerances to reduce deviation from the design specifications for the physical dimensions of the waveguide filter. However, such tight tolerances may introduce additional cost to the manufacturing process as tight tolerances may require high precision manufacturing techniques and/or require skilled production workers to manufacture waveguide filters to exacting specifications.

Additionally, the manufacture of waveguide filters may be subject to high waste in the form of unacceptable waveguide filters that are outside the acceptable tolerances relative to the design specification for physical dimensions of the waveguide filter. In either case, the result may be that manufacturing costs for waveguide filters is undesirably increased.

The present disclosure relates to a waveguide filter with adjustable performance through use of an electronically controlled variable dielectric material. Examples of a waveguide filter according to the present disclosure may utilize a variable dielectric material whose permittivity may be changed by application of an electric field to the variable dielectric material. In turn, when disposed within or adjacent to a waveguide conduit of a waveguide filter (e.g., adjacent to a resonant cavity of a waveguide conduit), the permittivity of the variable dielectric material may be controlled to control the performance of the waveguide filter. For example, controlling the permittivity of the variable dielectric material may be used to correct the performance of a waveguide filter, whose performance deviates from designed performance due to defects in a physical dimension of the waveguide filter from a design specification. That is, because the change in permittivity of the variable dielectric material changes scattering parameters of the waveguide filter, control of the permittivity of the variable dielectric material may be used to compensate for waveguide performance that deviates from a desired response. This ability to control the performance of the waveguide filter may allow for tolerances of the physical dimensions of the waveguide filter to be relaxed while the performance of the waveguide filter may be corrected if the physical dimensions of the waveguide filter vary from the design specifications due to manufacturing process variability, wear, and so forth.

Relaxing tolerances of the physical dimensions of a waveguide filter may significantly reduce the manufacturing cost and time of waveguide filters by allowing the waveguide filter to be manufactured using less precise manufacturing processes while reducing waste. Moreover, some applications may benefit from controllable scattering parameters of a waveguide filter for signal processing approaches. For instance, certain applications may benefit from the ability to alter the scattering parameters of a waveguide filter (e.g., during the operation of the waveguide filter) to achieve different signal processing objectives.

FIG. 1 schematically illustrates an example waveguide filter 100. The waveguide filter 100 may include a waveguide conduit 108. The waveguide conduit 108 may comprise a hollow passage through a body 102 of the waveguide filter 100. The body 102 of the waveguide filter 100 may comprise a metal or other conductive material. In some examples, the body 102 of the waveguide filter 100 may comprise aluminum. An electromagnetic wave 104 may be introduced into the waveguide conduit 108 at an input port 106 of the waveguide conduit 108. The electromagnetic wave 104 may propagate through the waveguide conduit 108 passing through at least one resonant cavity 110 and exit through an output port 112 of the waveguide conduit 108. The physical size and/or features of the waveguide conduit 108, including the resonant cavity 110, affects the ability of certain frequencies of the electromagnetic wave 104 to pass through the waveguide conduit 108. For example, a waveguide filter 100 may be used as a bandpass filter to allow a certain band of frequencies to pass through the waveguide filter 100, while rejecting frequencies outside of the band.

The various features, such as the size and shape of the resonant cavity 110, determine the effect of the waveguide filter 100 on an electromagnetic wave 104. While a single resonant cavity 110 is shown in FIG. 1 for simplicity of explanation, as will be described in greater detail below, a waveguide filter may include a plurality of resonant cavities (having same, similar, or different sizes and shapes) that may be coupled to collectively provide a desired performance of the waveguide filter. A number of different types or configurations of waveguide filters may utilize an electronically controlled variable dielectric material. For example, waveguide filters employing the technology described herein may include, but are not limited to, a cavity resonator waveguide, iris waveguide, iris-coupled waveguide, post waveguide, post-wall waveguide, insert filter waveguide, fin-line filter waveguide, or another appropriate configuration.

In any regard, a variable dielectric material 116 may be disposed adjacent to the resonant cavity 110. The variable dielectric material 116 may be subjected to an electric field to change the permittivity of the variable dielectric material 116. The permittivity of the variable dielectric material 116 adjacent to the resonant cavity 110 affects the performance (e.g., scattering parameters) of the waveguide filter 100. In turn, the performance of the waveguide filter 100 may be controlled by changing the permittivity of the variable dielectric material 116.

While examples of particular arrangements for the placement of the variable dielectric material 116 relative to the waveguide conduit 108 are described herein, it may be appreciated that the variable dielectric material 116 may be located in the waveguide filter 100 in any appropriate manner such that a change in permittivity of the variable dielectric material 116 alters the performance of the waveguide filter 100. Thus, while non-limiting examples in which the variable dielectric material 116 is disposed in a sidewall of the waveguide conduit 108 are described herein, other arrangements may be provided. For example, the variable dielectric material 116 may be located within the volume of a resonant cavity 110 or otherwise located to sufficiently affect the scattering parameters of the waveguide filter 100. If used with waveguide filters having features extending into the waveguide conduit 108 (e.g., irises, posts, walls, or other features), the features extending relative to the waveguide conduit 108 may comprise the variable dielectric material 116. That is, such features may be made from the variable dielectric material 116 or may otherwise contain a variable dielectric material 116.

As noted above, any variable dielectric material 116 in which the permittivity may be modified (e.g., via electronic control or other means) may be used in a waveguide filter 100. In one non-limiting example, the variable dielectric material 116 may comprise a graphene material. Other materials whose permittivity is changed in response to an applied electric field may be used without limitation. Other variable dielectric materials may include liquid crystal or other band-gap crystalline structure. Applying an electric field to a graphene material may affect the configuration of the carbon atoms in the graphene material, which may result in a change in the permittivity of the graphene material. The resulting permittivity change in the graphene material may be maintained, at least in part, even once the electric field has been removed from the variable dielectric material 116. In this regard, an electric field may be applied to set a permittivity of the variable dielectric material 116 to a desired value and thereafter be discontinued such that the permittivity of the variable dielectric material 116 remains at the desired value. In other examples, the electric field may be continuously or periodically applied to the variable dielectric material 116 to maintain a desired value of the permittivity of the variable dielectric material 116.

In a specific example, a variable dielectric material 116 may comprise an aqueous graphene oxide paste. Such a paste may comprise approximately 50% (by mass or by volume) graphene oxide and 50% (by mass or by volume) water. Such a paste may be sufficiently viscous to allow for the aqueous graphene oxide paste to be easy to handle and allow the aqueous graphene oxide paste to be sufficiently malleable to allow for receipt into a recess 114 in a sidewall of the waveguide conduit 108. In addition, the aqueous graphene oxide paste may also be relatively easily contained without having to account for the potential leakage of a variable dielectric material 116 at a lower viscosity. However, other configurations of graphene, including different relative proportions of water and graphene in an aqueous graphene oxide paste, may be used without limitation.

As shown in FIG. 1, the recess 114 containing the variable dielectric material 116 may be disposed in a sidewall of the waveguide conduit 108 adjacent to the resonant cavity 110. The recess 114 may define a well that accepts the variable dielectric material 116. The variable dielectric material 116 may fill the recess 114 such that the variable dielectric material 116 is substantially flush with the sidewall of the waveguide conduit 108. Further details regarding possible arrangements of the variable dielectric material 116 in a recess 114 for a resonant cavity 110 are provided below in the example of FIGS. 2-4.

Modifying the permittivity of the variable dielectric material 116 that is disposed adjacent to the resonant cavity 110 may result in a change in the scattering parameters of the resonant cavity 110. In turn, performance of the waveguide filter 100 may be changed, which may be used to compensate for performance that deviates from a design specification. Application of the electric field to the variable dielectric material 116 may be through the use of a tuning electrode 120. Moreover, a ground electrode 122 may be provided. A voltage controller 118 may apply a voltage to the tuning electrode 120, which results in an electric field being applied through the variable dielectric material 116 between the tuning electrode 120 and the ground electrode 122. In some examples, the ground electrode 122 may comprise the body 102 of the waveguide filter 100 in instances where the body 102 is conductive or includes a conductive pathway to a ground. One or both of the tuning electrode 120 and the ground electrode 122 may be in conductive contact with the variable dielectric material 116. That is, the tuning electrode 120 may physically contact the variable dielectric material 116. In other examples, the electric field may be induced in the variable dielectric material 116 without physical conductive contact with the variable dielectric material 116. In this latter example, an electric field may be induced in a plurality of portions of variable dielectric material 116 which may be arranged relative to a plurality of resonant cavities 110 as described in greater detail below.

In an example, the electric field may be discontinued after being applied to the variable dielectric material 116. That is, the permittivity of the variable dielectric material 116 may be changed in response to the electric field such that the change (or at least a portion thereof) is maintained upon cessation of the electric field through the variable dielectric material 116. In other examples, an electric field may be continuously or periodically applied to the variable dielectric material to achieve the change in permittivity of the variable dielectric material.

In the example in which the change in permittivity is maintained upon discontinuation of the application of the electric field, it may be desirable to modify the permittivity of the variable dielectric material 116 to "reset" or otherwise reconfigure the permittivity of the variable dielectric material 116. In turn, the voltage controller 118 may also be capable of applying a voltage to a reset electrode 124. The reset electrode 124 may be used to modify or reset the permittivity of the variable dielectric material 116 to a second state different than the permittivity resulting from the application of the electric field through the variable dielectric material 116 by the tuning electrode 120. The reset electrode 124 may utilize a common ground electrode 122 as the tuning electrode 120 or a dedicated reset ground electrode (not shown) may be used.

The reset electrode 124 may comprise a discrete electrode provided in conjunction with one of the tuning electrode 120 and the ground electrode 122 to apply an electric field in a different orientation than the tuning electrode 120. In other examples, the reset electrode 124 may comprise the tuning electrode 120 such that the permittivity of the variable dielectric material 116 is modified or reset by the application of a different electric field (e.g., of a different magnitude or of an inverse polarity using the tuning electrode 120) as was originally used to modify the permittivity of the variable dielectric material 116. In any regard, the reset electrode 124 may apply a reset electric field that is in a different magnitude and/or orientation than the electric field applied by the tuning electrode 120. The different magnitude and/or orientation of the reset electric field applied by the reset electrode 124 may result in a different change in permittivity of the variable dielectric material 116 from that set by the application of the electric field applied by the tuning electrode 120. In the example where an electric field is continuously applied to achieve the change in permittivity, resetting the material may include removing the applied electric field. That is, in examples in which an applied electric field is continuously or periodically applied to maintain a desired change in permittivity of a variable dielectric material, a reset electrode may not be provided as discontinuing the application of the electric field may result in "reset" of the permittivity of the variable dielectric material.

Figure 2:
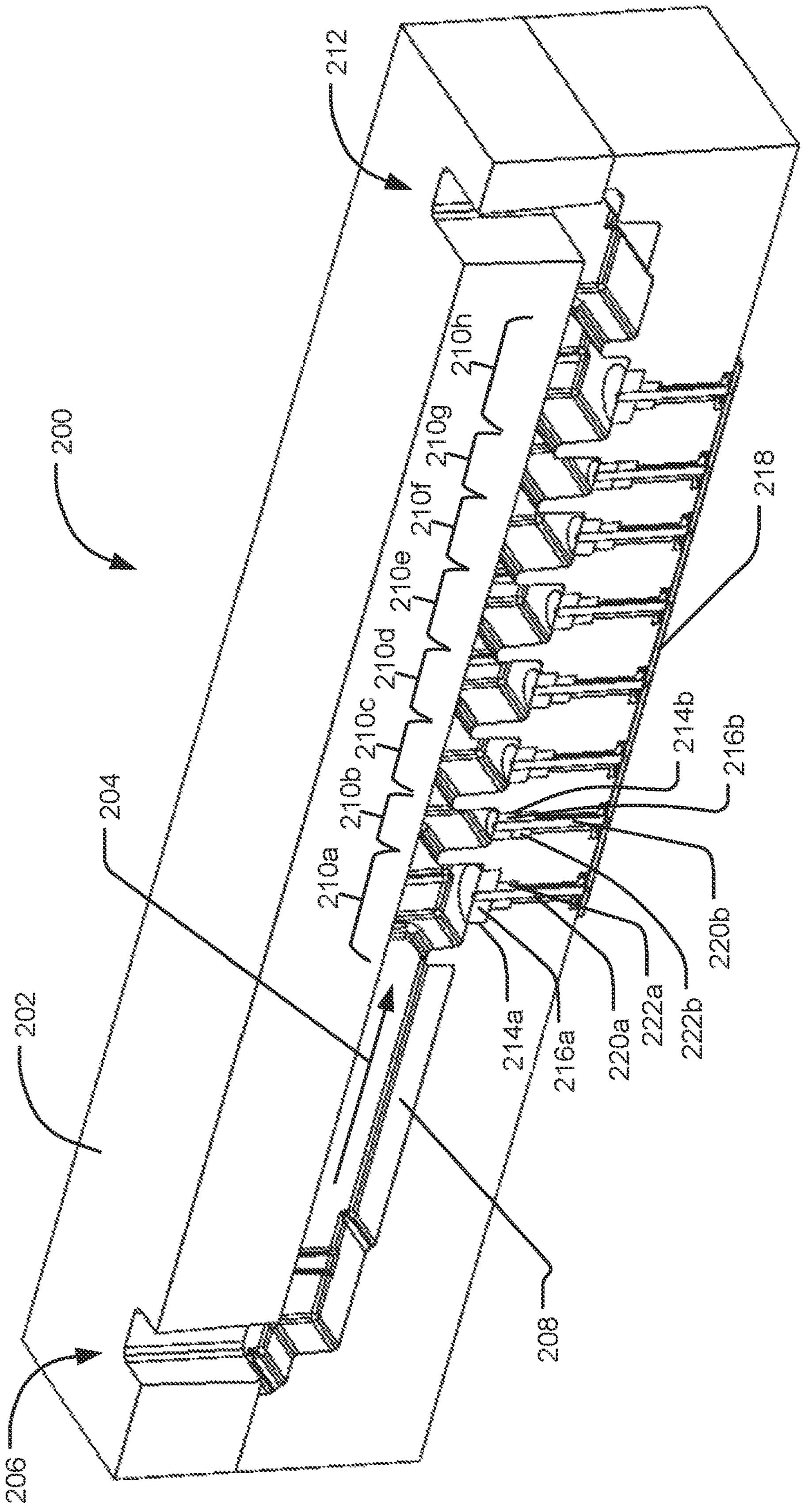
FIG. 2 illustrates a cross-sectional side view of an example waveguide filter having a plurality of resonant cavities that include a variable dielectric material.
Figure 3:
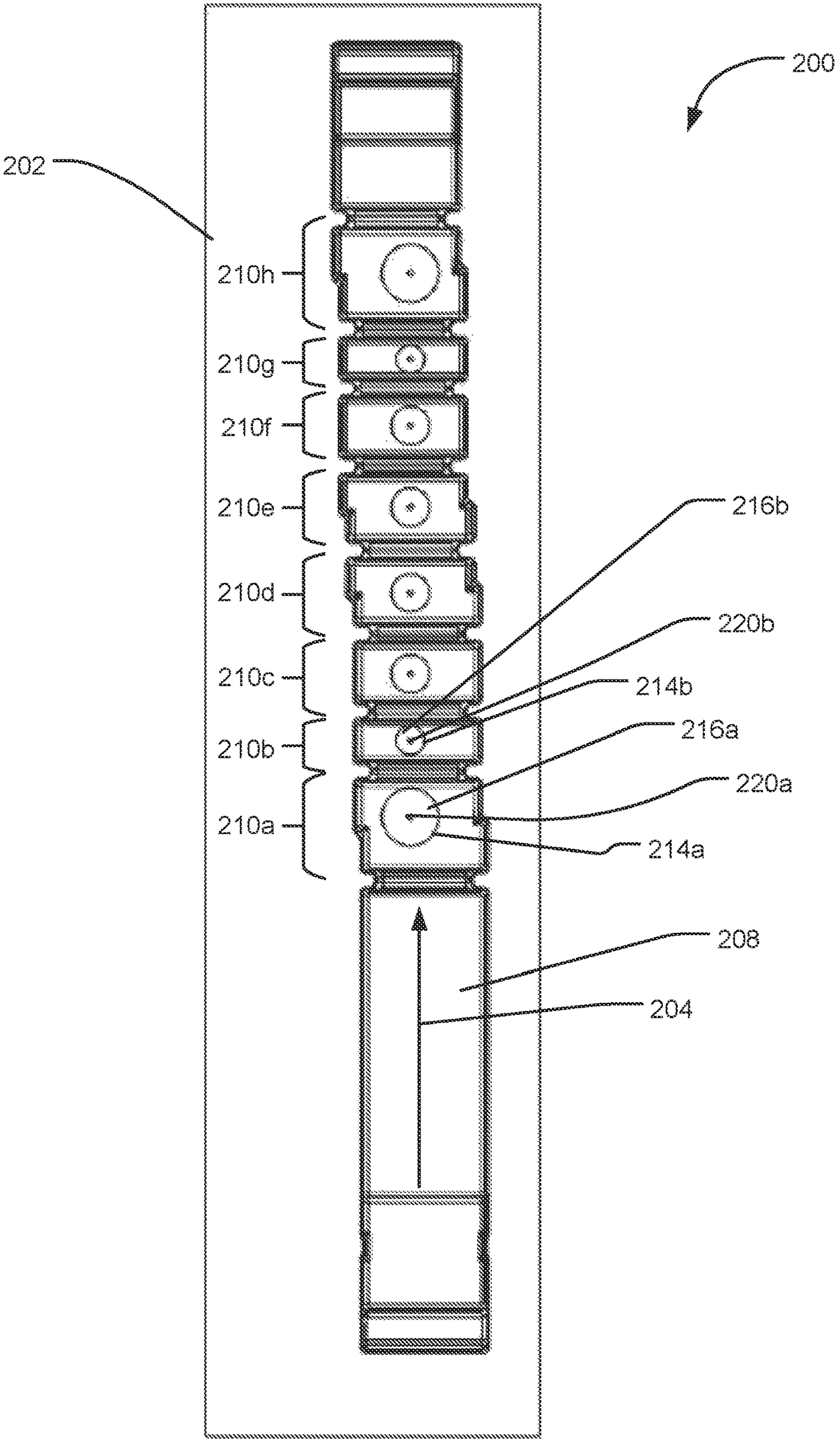
FIG. 3 illustrates a cross-sectional top view of an example of a waveguide filter having a plurality of resonant cavities that include a variable dielectric material.
Figure 4:
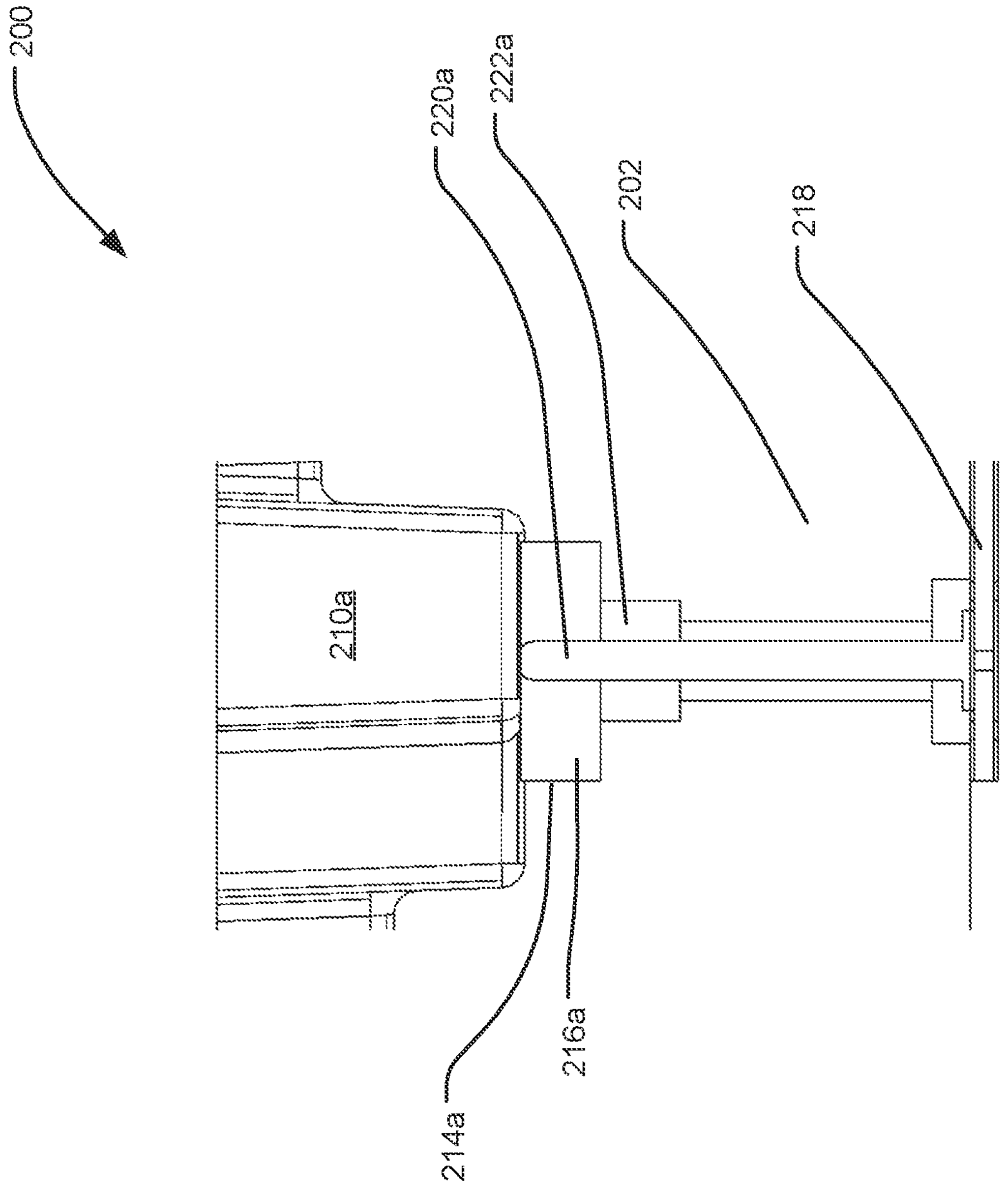
FIG. 4 illustrates a cross-sectional side view of an example resonant cavity comprising a variable dielectric material.

With further reference to FIG. 2, a cross-sectional side view of an example waveguide filter 200 is shown. In FIG. 2, the waveguide filter 200 is shown in a side view with cross section along a major axis of propagation of an electromagnetic wave 204 through a waveguide conduit 208 as represented by the arrow in FIG. 2. In FIG. 3, the waveguide filter 200 is shown in a cross-sectional top view, with the cross section along a major axis of the prorogation of the electromagnetic wave 204. FIG. 4 illustrates a detailed cross-sectional side view of a given portion of a resonant cavity 210*a*.

The waveguide filter 200 includes an input port 206 and output port 212 at opposite ends of the waveguide conduit 208. In turn, the waveguide conduit 208 may define a passage through a body 202 of the waveguide filter 200. The waveguide conduit 208 may be a hollow passage through the body 202, may be filled with a dielectric material, with air, or may be a vacuum.

The example of the waveguide filter 200 may include a plurality of resonant cavities 210*a*-210*h*. The plurality of resonant cavities may be arranged relative to one another and have respective sizes and shapes to achieve a desired performance of the waveguide filter 200. In turn, the waveguide filter 200 may be used to filter an electromagnetic wave 204 propagating through the waveguide conduit 208. As may be appreciated, the plurality of resonant cavities 210*a*-210*h* may have relatively complex shapes that, when subject to tight tolerances, may be particularly difficult to manufacture with acceptable tolerances for the physical dimensions. Accordingly, use of a variable dielectric material with one or more of the resonant cavities 210*a*-210*h* may allow for tuning of the performance of the waveguide filter 200 to accommodate for physical dimensions of the waveguide filter 200 at a wider acceptable tolerance.

The waveguide filter 200 may include a resonant cavity 210*a*. At least one other resonant cavity may be provided along the length of the waveguide conduit 208. The other resonant cavity may be referred to as a coupled resonant cavity 210*b* as the coupled resonant cavity 210*b* may work in concert with the resonant cavity 210*a* to achieve the performance of the waveguide filter 200. In other words, the scattering parameters of the waveguide filter 200 may be established by the interaction of the coupled resonant cavity 210*b* with the resonant cavity 210*a* to provide an overall performance of the waveguide filter 200. That is, the physical properties of the two cavities, individually and as arranged relative to one another, can be considered an interaction. The geometries of one resonant cavity can affect how the other will perform. The resonant cavities may not independently affect the performance of the waveguide filter 200, but rather, work together to achieve the performance of the waveguide filter 200.

While a single additional coupled resonant cavity 210*b* is described in detail, the waveguide filter 200 may include a plurality of coupled resonant cavities that cooperate to define the overall performance of the waveguide filter 200. Also, while each coupled resonant cavity is shown with a variable dielectric material and tuning electrode, not all resonant cavities of a waveguide filter need to include a variable dielectric material, different resonant cavities may include different quantities of a variable dielectric material, different resonant cavities may include different variable dielectric materials, and so forth. Moreover, the presence of variable dielectric material, an amount of variable dielectric material, and/or a type of variable dielectric material may be changed for different ones of the resonant cavities to control the performance of the waveguide filter 200.

As shown in FIGS. 2-4, the resonant cavity 210*a* may include a first variable dielectric material 216*a*. The first variable dielectric material 216*a* may be disposed in a first recess 214*a* adjacent to the resonant cavity 210*a*. A first tuning electrode 220*a* may be configured for conductive contact with the first variable dielectric material 216*a*. Specifically, the first tuning electrode 220*a* may extend through a first seal 222*a*. The first seal 222*a* may prevent the first variable dielectric material 216*a* from leaking from or otherwise evacuating the first recess 214*a*.

The coupled resonant cavity 210*b* may include a second variable dielectric material 216*b* disposed in a second recess 214*b* adjacent to the coupled resonant cavity 210*b*. The second recess 214*b* may also have a second seal 222*b* that helps maintain the second variable dielectric material 216*b* in the second recess 214*b*. A second tuning electrode 220*b* may extend through the second seal 222*b* and into the second variable dielectric material 216*b*.

A circuit board 218 may be disposed at an exterior of the body 202. The circuit board 218 may include conductive elements establishing electrical communication with the first tuning electrode 220*a*. The circuit board 218 may be used to establish a connection between a voltage controller and the first tuning electrode 220*a* such that voltage may be applied to the first tuning electrode 220*a*, which may create a first electric field through the first variable dielectric material 216*a* to change a permittivity of the first variable dielectric material 216*a*. In the example shown in FIG. 2, the body 202 may comprise a conductive material such that the body 202 surrounding the first variable dielectric material 216*a* may act as a ground electrode that couples with the first tuning electrode 220*a* to achieve the electric field in the first variable dielectric material 216*a* upon application of a voltage to the first tuning electrode 220*a*.

The second tuning electrode 220*b* may also be in conductive communication with the circuit board 218. In turn, the circuit board 218 may be used to establish a connection between a voltage controller and the second tuning electrode 220*b* such that a voltage may be applied to the second tuning electrode 220*b*, which may create a second electric field through the second variable dielectric material 216*b* to change a permittivity of the second variable dielectric material 216*b*.

The circuit board 218 may include independent control of the first tuning electrode 220*a* and second tuning electrode 220*b* to allow for different voltages to be applied to the first tuning electrode 220*a* and the second tuning electrode 220*b*. This may result in different field strengths of the first electric field applied through the first variable dielectric material 216*a* and the second electric field applied through the second variable dielectric material 216*b*. In turn, the permittivity of the first variable dielectric material 216*a* and second variable dielectric material 216*b* may be independently controllable for the resonant cavity 210*a* and the coupled resonant cavity 210*b*. In other examples, the first tuning electrode 220*a* and the second tuning electrode 220*b* may have the same voltage applied thereto, whether independently controlled or coupled to a common voltage source.

While not described herein in detail for brevity, a number of additional coupled resonant cavities may be provided including coupled resonant cavity 210*c*, coupled resonant cavity 210*d*, coupled resonant cavity 210*e*, coupled resonant cavity 210*f*, coupled resonant cavity 210*g*, and coupled resonant cavity 210*h*. While each of these additional coupled resonant cavities 210*c*-210*h* are not described in detail, each coupled resonant cavity 210*c*-210*h* may include similar structures as those described in relation to the resonant cavity 210*a* and coupled resonant cavity 210*b*. In addition, each tuning electrode of the coupled resonant cavities 210*c*-210*h* may be independent from one another such that unique voltages may be applied to each, thus resulting in independently controlled permittivity changes in the respective variable dielectric material for each coupled resonant cavity. While eight coupled resonant cavities are shown in FIGS. 2-3, it may be appreciated that any number of resonant cavities may be provided without limitation. Moreover, while in some examples each tuning electrode of the various coupled resonant cavities may be independently controlled, in other examples, some of the tuning electrodes may be commonly controlled to receive the same voltage.

As noted above, changing the permittivity of a variable dielectric material adjacent to a resonant cavity may affect the performance of a waveguide filter by modification of the scattering parameters of the waveguide filter. To further illustrate this, FIG. 5 includes plot 500, plot 520, and plot 550 that each illustrate scattering parameters of a waveguide filter. The vertical axis of plot 500 may represent scattering parameters and the horizontal axis may represent frequency. The trace of plot 500 represents a frequency response of an optimized waveguide filter according to the present disclosure. That is, plot 500 illustrates a waveguide filter that has idealized physical dimensions and performs to a designed specification.

Figure 5:
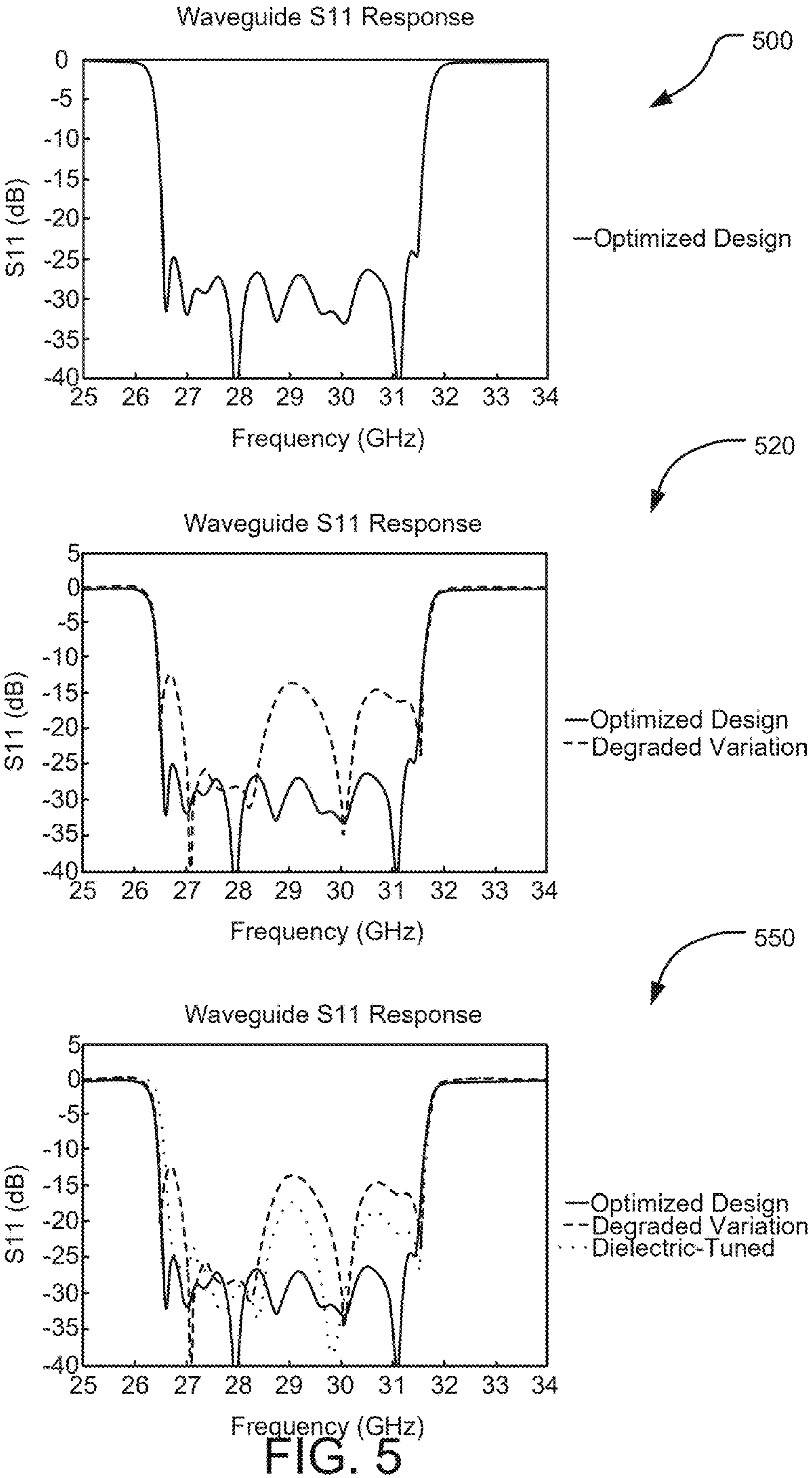
FIG. 5 illustrates example plots of the performance of an optimal waveguide filter, a waveguide filter with physical dimensions that deviate from nominal, and a waveguide filter with physical dimensions that deviate from nominal with performance correction using an electronically controlled variable dielectric material.

Generally, waveguides can perform in a frequency range as low as 0.32 GHz and as high as 1100 GHz, with the percent bandwidth of standardized waveguides typically at around 40%. As FIG. 5 illustrates, in an example, the performance of the waveguide filter may be in a frequency range of not fewer than about 25 GHz and not more than about 34 GHz. In other examples, the performance of the waveguide filter may be in a frequency range of not fewer than 14 GHz and not more than about 70 GHz. In other examples, the performance of the waveguide filter may be in a frequency range of not fewer than 15 GHZ and not more than about 50 GHz. Accordingly, the waveguide filter may perform in the microwave portion of the electromagnetic spectrum. This portion of the electromagnetic spectrum is often used for communication purposes, such as satellite communications, in which waveguide filters may be utilized.

Plot 500 depicts the scattering parameter S11 performance of a waveguide filter. The waveguide filter comprises resonant cavities with the geometries of the cavities tuned for an optimized performance. The optimized waveguide filter achieves a scattering parameter S11 performance of better than −25 dB from 27 GHz to 31 GHz. Plot 520 depicts a degraded performance relative to the optimized waveguide filter. The degradation in performance may result from modeled deviations in the physical dimensions of the waveguide filter from a design specification. Specifically, plot 520 represents structure model dimensions with a Gaussian distribution between plus or minus two thousandths of an inch with running random iterations to mimic the results of typical manufacturing processes. Plot 520 illustrates that the scattering parameters of the degraded waveguide filter can degrade by more than 10 dB relative to the optimized waveguide filter, even with tight dimensional tolerances, resulting in a rejection of the manufactured component.

As an illustration in the ability to compensate a degraded waveguide filter with electronically controlled variable dielectric material, plot 550 depicts the results of a dielectric-tuned waveguide filter in which the degraded filter is corrected by optimizing the permittivity of a variable dielectric material adjacent to the resonant cavities as described in previous sections. The values of the permittivity of the variable dielectric material in the simulation were consistent with the typical value of an aqueous graphene oxide paste, individually optimized as needed between plus or minus 25% of the standard dielectric value. As a result, the dielectric-tuned filter improves the response by nearly 4 dB, thus correcting the performance of the otherwise out of tolerance waveguide filter into an acceptable component for field operation.

Figure 6:
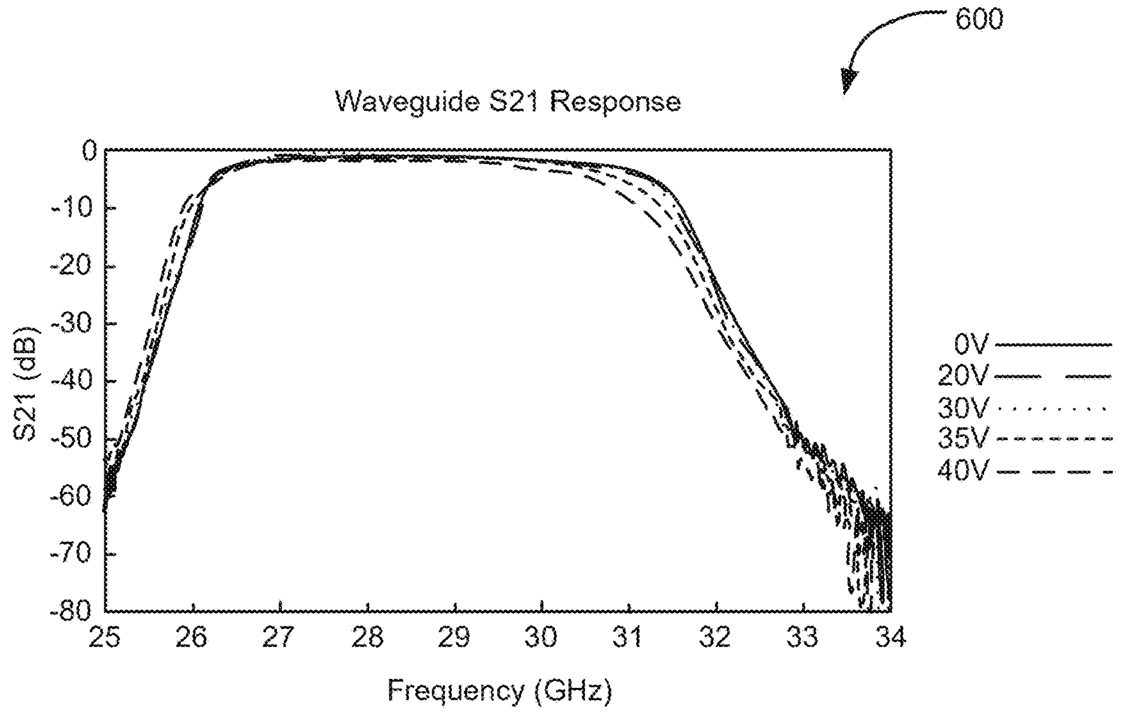
FIG. 6 illustrates example plots showing an example of shifting performance of an example waveguide filter in response to different magnitudes of electric field being applied to a variable dielectric material.
Figure 6:
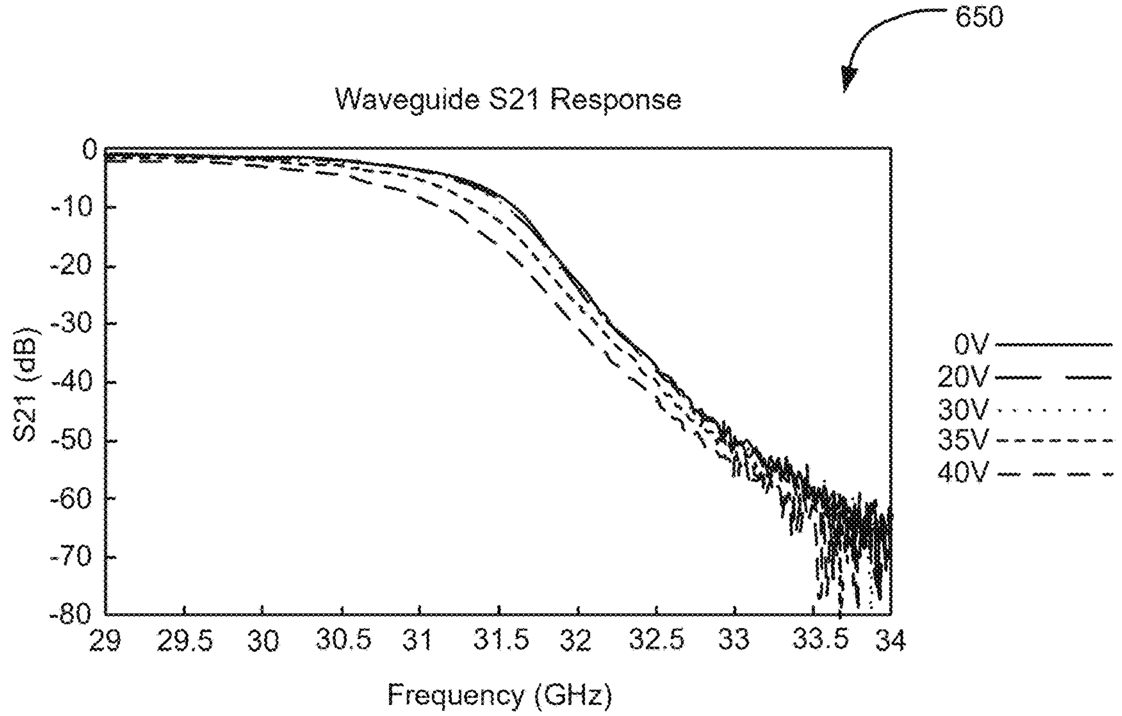

In FIG. 6, plot 600 includes a plurality of traces representing scattering parameters of a waveguide filter in which different electric field strengths are applied to a variable dielectric material of the waveguide filter. Plot 650 shows a detailed view of plot 600 at a frequency range of between 29 GHz and 34 GHz. As can be better appreciated in plot 650, the effect of the different electric field strengths applied through the variable dielectric material is to provide a change in the scattering parameters S21 of the waveguide filter with higher voltages generally corresponding to a shift to lower frequencies for the waveguide filter (i.e., a frequency response of the corresponding waveguide filter shifts to the left realative to the plot 650). This shift in the scattering parameters S21 of the waveguide may be due to the change in permittivity of the variable dielectric material resulting from the application of the electric field to the variable dielectric material. Such a shift in the performance of the waveguide filter may be used to tune the performance of the waveguide filter to, for example, reject an unwanted signal component that may be prominent at specific operational frequencies. As will be described in greater detail below, the control of the electric field applied to the variable dielectric material may be based on the monitored performance of a waveguide filter such that the scattering parameters are modified to achieve a desired performance for the waveguide filter.

Figure 7:
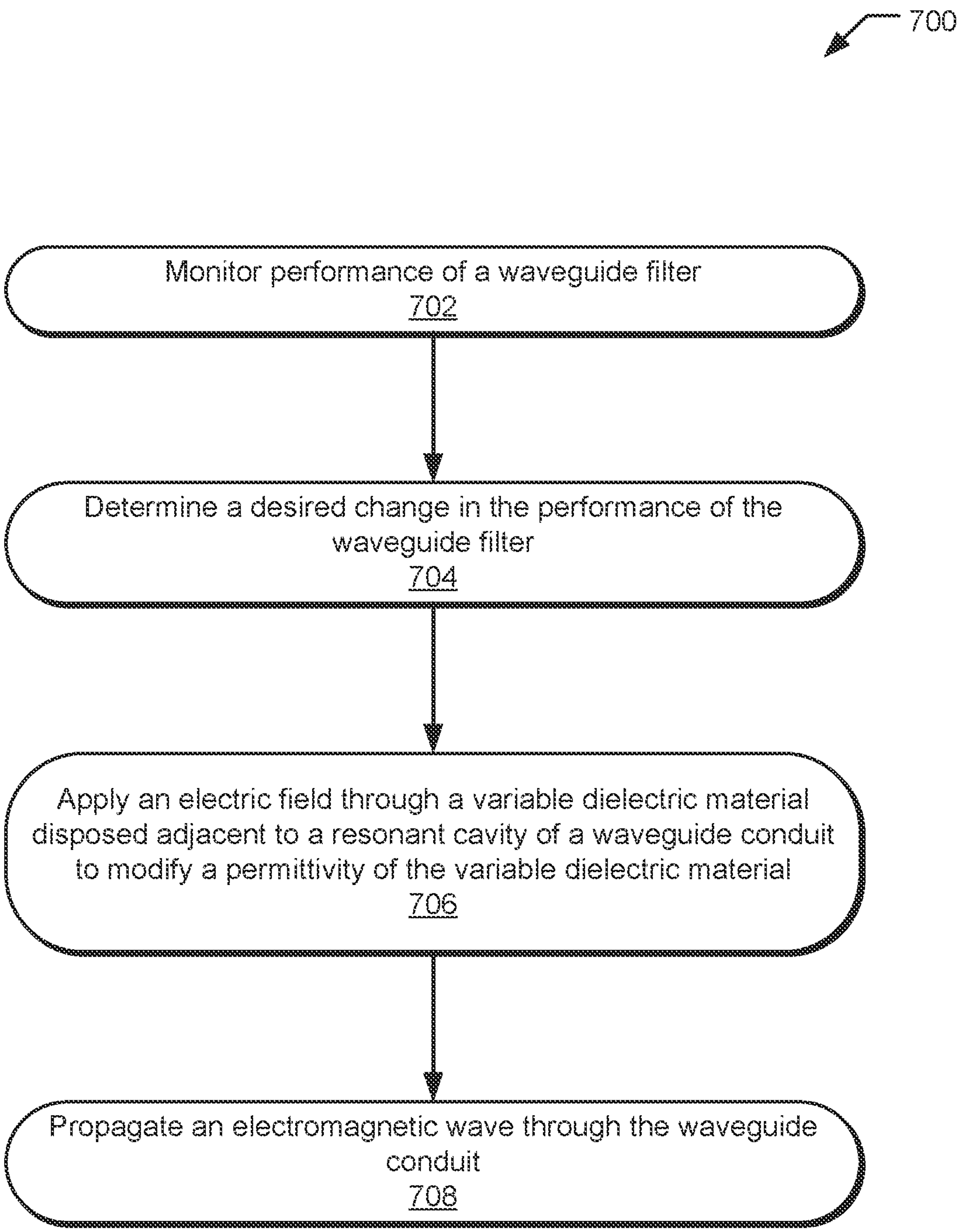
FIG. 7 illustrates an example of a method of operation of a waveguide filter with an electronically controlled variable dielectric material.

With further reference to FIG. 7, an example of a method 700 for operation of a waveguide filter according to the present disclosure is illustrated. The method 700 may include a monitoring operation 702. The monitoring operation 702 may include observing (e.g. measuring) performance of a waveguide filter. In one example, the performance of the waveguide filter may be characterized through measured scattering parameters, such as those described above in FIGS. 5 and 6. The monitoring operation 702 may occur at any time during operation of the waveguide filter, including before any application of an electric field to a variable dielectric material or at some time after an electric field has been applied to a variable dielectric material to modify the permittivity of the variable dielectric material. In this regard, the monitoring operation 702 may be performed in an initialization process for the waveguide filter to tune the waveguide filter to a nominal or designed performance. Additionally or alternatively, monitoring operation 702 may be performed after initialization tuning of the waveguide filter to achieve a change in performance as desired.

The method 700 may also include a determining operation 704 in which a desired change in the performance of the waveguide filter is determined. The determining operation 704 may be performed based on the observed performance of the waveguide filter in the monitoring operation 702. For example, a waveguide filter may have an undesired or non-nominal performance resulting from variations in one or more physical dimensions of a waveguide conduit of the waveguide filter. Such variations in dimension may result from variations in a manufacturing process. The monitoring operation 702 may be used to observe a deviation in performance of the waveguide filter from a nominal or designed performance. In turn, the determining operation 704 may be utilized to determine a desired change in the performance of the waveguide filter to achieve nominal design performance. The determining operation 704 may include use of an algorithm, lookup table, or other quantitative approach to determine the desired change in the performance of the waveguide filter. In other examples, the determining operation 704 may be based on empirical study of the effects of a change in the permittivity of a variable dielectric material in a waveguide filter.

The method 700 may include an applying operation 706 in which an electric field is applied through a variable dielectric material that is disposed adjacent to a resonant cavity of the waveguide filter. As described above, the electric field applied through the variable dielectric material may be applied using a tuning electrode that may be in conductive contact with the variable dielectric material to apply a voltage between the tuning electrode and a ground electrode. As a result, an electric field may be established to the variable dielectric material. In turn, a permittivity of the variable dielectric material may be modified in response to the applying of the electric field in the applying operation 706. The applying operation 706 and resulting modification of a permittivity of a variable dielectric material may occur for a single resonant cavity of a waveguide filter or the applying operation 706 may include application of an electric field to and modification of the permittivity of a variable dielectric material for a plurality of resonant cavities. In the event that the applying operation 706 involves a plurality of resonant cavities, the applying operation 706 and the resulting modification of a permittivity of a variable dielectric material may be independently performed for each resonant cavity as noted above.

In some examples, the applying operation 706 may include altering the variable dielectric material in ways other than the application of an electric field thereto. For example, the applying operation 706 may also include physical changes to the variable dielectric material such as adding material, removing material, or altering the type of material used. This may include different relative changes to different resonant cavities in the case where a plurality of resonant cavities are provided.

In addition, the method 700 may include a propagating operation 708 in which an electromagnetic wave is propagated through the waveguide filter. As the change in permittivity of the variable dielectric material may have been changed in the applying operation 706, resulting scattering parameters for the waveguide filter may also be modified from those measured in the monitoring operation 702. Thus, the method 700 may be used to control the scattering parameters of the waveguide filter to achieve a performance of the waveguide filter (e.g., to correct for deviations from a design specification). In turn, the propagating operation 708 may result in the waveguide filter affecting the electromagnetic wave with a filtering operation using the changed scattering parameters. Such a filtering operation may occur to condition a signal of the electromagnetic wave for purposes of communication or the like. The propagating operation 708 may be performed after the applying operation 706 in which the permittivity of the variable dielectric material has been modified.

In one example, the method 700 may be performed to achieve a desired performance of the waveguide filter, which may require a single instance of the method 700. While not shown in FIG. 7, in other examples, the method 700 may iterate back to the monitoring operation 702 such that the process of the method 700 may be iteratively performed (e.g., during operation of the waveguide filter). Such iteration of the method 700 may allow for control loop feedback to be established for continuous control of the waveguide filter to achieve the desired performance of the waveguide filter. Such a control loop may be used to achieve the design performance for the waveguide filter or the performance of the waveguide filter may be variable such that for different operating conditions, the waveguide filter may be controlled to perform with different scattering parameters that may be tailored to a given application of the waveguide filter.

Figure 8:
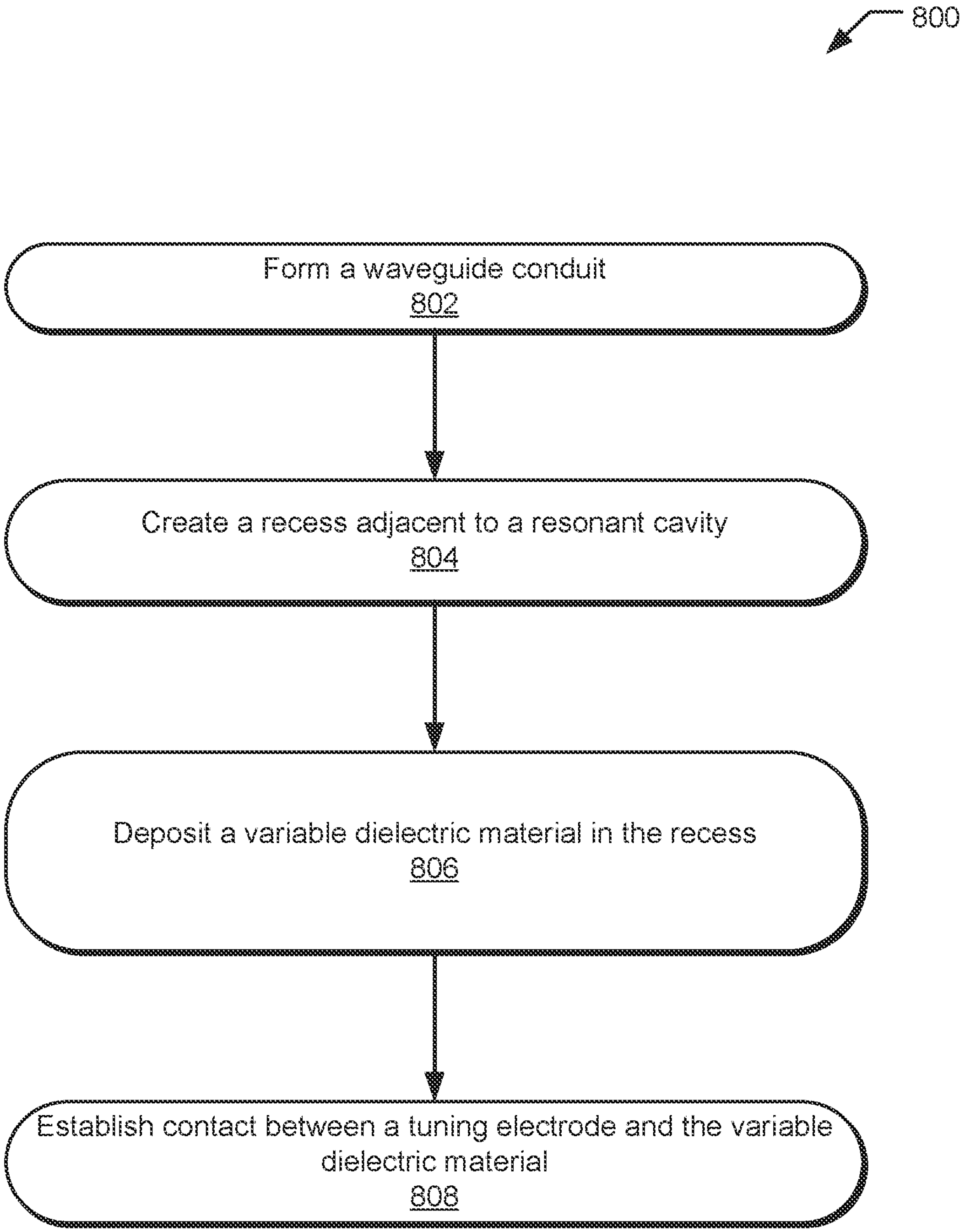
FIG. 8 illustrates an example of a method of manufacture of a waveguide filter with an electronically controlled variable dielectric material.

FIG. 8 illustrates an example method 800 of manufacture of a waveguide filter. The method 800 may include a forming operation 802 in which a waveguide conduit is formed. The forming operation 802 may include any appropriate manufacture technique such as casting, forging, milling, stamping, additive manufacturing (3D printing), etc. The forming operation 802 may include forming the waveguide conduit in a body such that the waveguide conduit is formed by removal of material from the body (e.g., in a milling operation or the like). Alternatively, the body may be formed to create the waveguide conduit (e.g., in a casting, forging, stamping, or additive manufacturing operation). In some examples, the waveguide conduit is partially formed to two portions of a body, which are united to define the waveguide conduit. The forming operation 802 may also include forming one or more resonant cavities of the waveguide conduit in any manner described above.

The method 800 may also include a creating operation 804 in which a recess is created adjacent to a resonant cavity of the waveguide conduit. The creating operation 804 may be performed subsequent to or substantially contemporaneously with the forming operation 802. For example, in an example in which the forming operation 802 includes a milling or other material removal operation to form the waveguide conduit, the creating operation 804 may include a subsequent manufacturing step to create the recess relative to the resonant cavity of the waveguide conduit. In an example in which the waveguide conduit is formed in a casting, forging, stamping, additive manufacturing, or other process in which the body is formed to create the waveguide conduit, the recess may be formed during the same manufacturing operation used to form the waveguide conduit.

The method 800 may also include a depositing operation 806 in which a variable dielectric material is deposited in the recess. The depositing operation 806 may include filling the recess with an aqueous graphene oxide paste. The method 800 may also include an establishing operation 808 in which contact between a tuning electrode and the variable dielectric material is established. The establishing operation 808 may occur subsequent to or substantially contemporaneously with the depositing operation 806. That is, the tuning electrode may be positioned relative to the recess prior to the depositing operation 806, such that upon the depositing operation 806, contact between the variable dielectric material and the tuning electrode is established. In other examples, the depositing operation 806 may occur and the tuning electrode may be subsequently contacted with the variable dielectric material.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A waveguide filter with electronically controlled variable dielectric material, comprising:
- a waveguide conduit;
- a resonant cavity comprising at least a portion of the waveguide conduit;
- a variable dielectric material disposed adjacent to the resonant cavity, wherein the variable dielectric material comprises an aqueous graphene oxide paste;
- a tuning electrode to apply an electric field through the variable dielectric material for modification of a permittivity of the variable dielectric material; and
- a recess in a sidewall of the waveguide conduit adjacent to the resonant cavity, wherein the resonant cavity is defined by the sidewall of the waveguide conduit, and wherein the variable dielectric material is located in the recess, wherein the tuning electrode extends into the recess and is in contact with the variable dielectric material to apply the electric field through the variable dielectric material.

2. The waveguide filter of claim 1, further comprising:
- a coupled resonant cavity disposed relative to the resonant cavity along the waveguide conduit;
- a second variable dielectric material disposed adjacent to the coupled resonant cavity, wherein the second variable dielectric material comprises a graphene material; and
- a second tuning electrode to apply a second electric field through the second variable dielectric material for modification of a second permittivity of the second variable dielectric material.

3. The waveguide filter of claim 2, wherein the tuning electrode and the second tuning electrode are independently controllable for independent application of the electric field in the variable dielectric material and the second electric field in the second variable dielectric material.

4. The waveguide filter of claim 3, wherein a magnitude of the electric field is different than the second electric field.

5. The waveguide filter of claim 1, further comprising:
- a reset electrode to apply a reset electric field through the variable dielectric material, the reset electric field being in a different orientation relative to the variable dielectric material than the electric field.

6. The waveguide filter of claim 5, wherein the reset electrode comprises the tuning electrode at an inverse polarity.

7. The waveguide filter of claim 5, wherein the reset electrode comprises a discrete electrode different than the tuning electrode disposed at a different physical orientation relative to the variable dielectric material than the tuning electrode.

8. The waveguide filter of claim 1, wherein the sidewall comprises a ground electrode.

9. The waveguide filter of claim 1, further comprising:
- a voltage controller that controls the electric field applied by the tuning electrode through the variable dielectric material to control the permittivity of the variable dielectric material and, in response, scattering parameters of the waveguide filter.

10. The waveguide filter of claim 1, wherein the resonant cavity and the variable dielectric material are configured to allow an electromagnetic wave comprising a frequency of not fewer than about 26 GHz and not more than about 40 GHz to propagate through the waveguide conduit.

11. The waveguide filter of claim 1, wherein the tuning electrode is in conductive communication with the variable dielectric material.

12. A method of operation of a waveguide filter with electronically controlled variable dielectric material, the method comprising:
- applying, with a tuning electrode, an electric field through a variable dielectric material disposed adjacent to a resonant cavity of a waveguide conduit wherein the variable dielectric material comprises an aqueous graphene paste; and
- modifying a permittivity of the variable dielectric material in response to the electric field, wherein the permittivity of the variable dielectric material affects performance of the waveguide filter;
- wherein the variable dielectric material is located in a recess in a sidewall of the waveguide conduit adjacent to the resonant cavity, wherein the resonant cavity is defined by the sidewall of the waveguide conduit, wherein the tuning electrode extends into the recess and is in contact with the variable dielectric material to apply the electric field through the variable dielectric material.

13. The method of claim 12, the method comprising:
- applying, with a second tuning electrode, a second electric field through a second variable dielectric material disposed adjacent to a coupled resonant cavity of the waveguide conduit, the coupled resonant cavity being disposed relative to the resonant cavity along the waveguide conduit, wherein the variable dielectric material comprises a graphene material; and
- modifying a second permittivity of the second variable dielectric material in response to the second electric field.

14. The method of claim 13, wherein the electric field and the second electric field are independently applied to the tuning electrode and the second tuning electrode, respectively.

15. The method of claim 14, wherein a magnitude of the electric field is different than the second electric field.

16. The method of claim 12, further comprising:
- applying a reset electric field through the variable dielectric material with a reset electrode, the reset electric field being in a different orientation relative to the variable dielectric material than the electric field.

17. The method of claim 16, wherein the reset electrode comprises the tuning electrode at an inverse polarity.

18. The method of claim 16, wherein the reset electrode comprises a discrete electrode different than the tuning electrode disposed at a different physical orientation relative to the variable dielectric material than the tuning electrode.

19. The method of claim 12, wherein the sidewall comprises a ground electrode.

20. The method of claim 12, further comprising:
- monitoring performance of the waveguide filter; and
- determining a magnitude of the electric field applied by the tuning electrode in response to the performance.

21. The method of claim 12, wherein the resonant cavity and the variable dielectric material are configured to allow an electromagnetic wave comprising a frequency of not fewer than about 26 GHz and not more than about 40 GHz to propagate through the waveguide conduit.

22. The method of claim 12, wherein the tuning electrode is in conductive communication with the variable dielectric material.

* * * * *